INVENTOR.
ALFRED E. MANN
BY Elliott & Pastoriza
ATTORNEYS

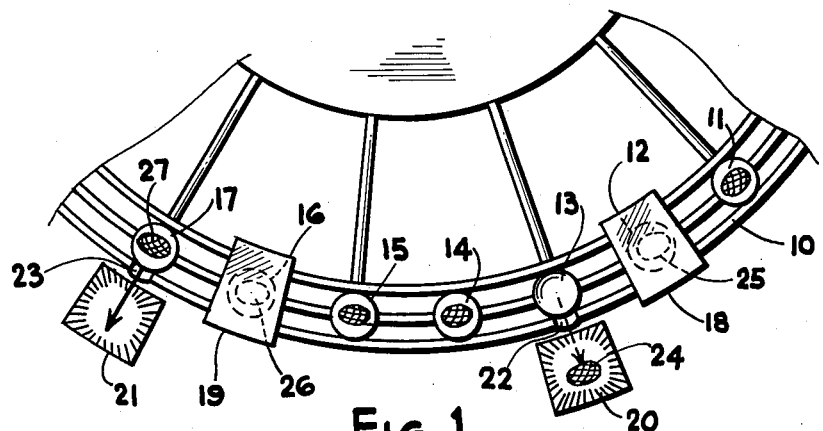
FIG. 1
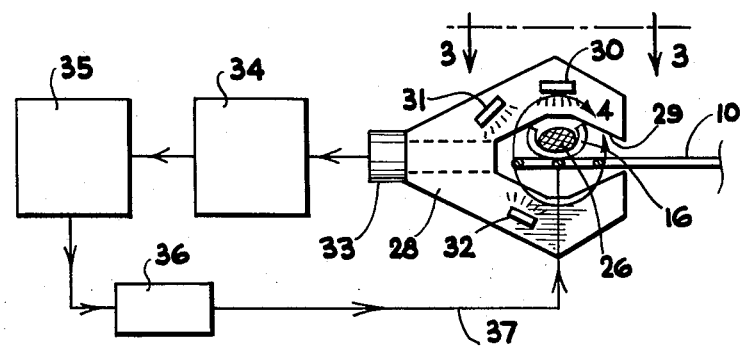
FIG. 2
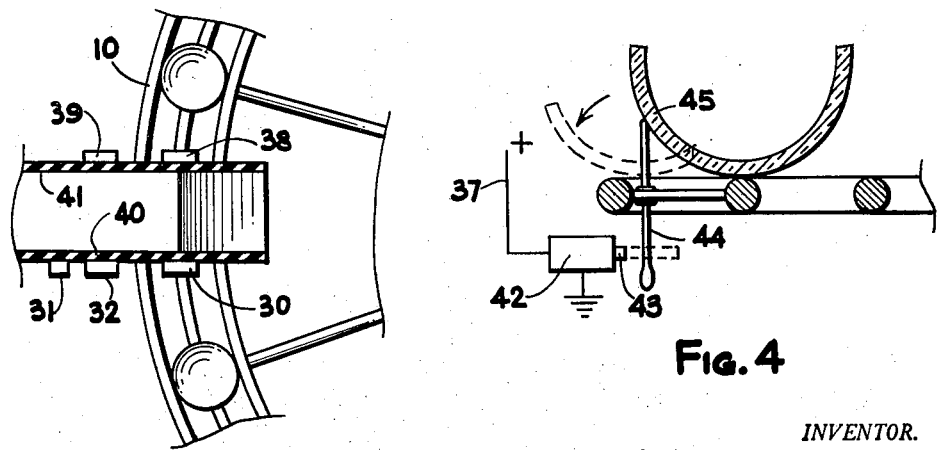
FIG. 3
FIG. 4
INVENTOR.
ALFRED E. MANN
BY Elliott & Pastoriza
ATTORNEYS Nov. 13, 1962　　　　　A. E. MANN　　　　　3,064,136
AUTOMATIC SORTING SYSTEM
Filed Jan. 27, 1959　　　　　　　　　　　　　　　4 Sheets-Sheet 2

United States Patent Office 3,064,136
Patented Nov. 13, 1962

3,064,136
AUTOMATIC SORTING SYSTEM
Alfred E. Mann, North Hollywood, Calif., assignor to Textron Electronics, Inc., a corporation of Delaware
Filed Jan. 27, 1959, Ser. No. 789,329
12 Claims. (Cl. 250—223)

This invention relates to automatic sorting systems and more particularly to an improved system for sorting various objects in accordance with their color by spectral analysis. A preferred application of this invention is in the food processing industry wherein the quality, ripeness, and other characteristics of foods such as fruits, for example, can be determined by differences in their color.

Heretofore, several instruments have been proposed for effecting automatic color selection and sorting of fruits. Some of these prior systems subject the fruit to monochromatic light and attempt to measure the reflectivity by photo-electric means. Others propose the filtering of reflected light from the object and then measuring its spectral intensity by means of suitable photo-electric cells.

None of the prior art systems to date has achieved real success primarily because of poor spectral selectivity, low light levels, and limitations in the electrical and optical techniques employed. For example, some systems are very sensitive to stray light and require complicated light chambers which seriously limit the rate at which objects on a conveyor can be sorted. Other systems employ relatively complicated electronics which render the system costly to construct, relatively bulky, and expensive to maintain. Moreover, many systems proposed heretofore are difficult to adapt for particular situations with the result that a substantially complete sorting machine must be built for and adapted to each particular problem.

Bearing the foregoing in mind, it is a primary object of the present invention to provide a vastly improved automatic sorting system which will select and sort objects at considerably higher speed and with greater accuracy than has heretofore been possible.

More particularly, it is an object to provide a sorting system for lemons, watermelons, tomatoes, walnuts, apples, pears, peaches, and virtually all forms of produce for which mass production processing is suitable.

Other important objects of this invention are to provide a system meeting the foregoing objects which is relatively insensitive to stray light, includes a minimum of electrical components, and which is easy to adjust for use with different groups of objects to the end that a single system can be portable and employed for a number of different jobs with only minor modifications in the optical portions thereof.

These and many other objects and advantages of this invention are attained by providing a light chamber through which a series of objects are individually passed at a high rate of speed. Color analyzing means are positioned to receive and analyze light reflected from each of the objects as they pass through the light chamber. The analyzing means employs two different light filters and a light chopping arrangement so that the reflected light is alternately passed through the different filters. One of the light filters provides a narrow spectral band indicative of the color of the object passing through the light chamber while the other filter passes a reference spectral band separated from the first spectral band. These two spectral portions of the reflected light are alternately received in a single photoelectric cell and a comparison of the magnitudes of the currents generated by the photo-electric cell is made.

The output of the photo-electric cell is connected to a suitable signal generating means which will provide a signal in response to the magnitudes of the current signals from the photo-cell. Thus, if the color indicating spectral portion of light results in a photo-cell current of greater magnitude than the reference spectral portion, a suitable signal is generated in the signal generating means for actuating a mechanism to separate the particular object passing through the light chamber at that time from the others. On the other hand, if the color indicating spectral portion results in a current of less magnitude than that resulting from the reference spectral portion, the object passing through the light chamber is not separated but may be passed on to a second sorting unit.

The degree of color selection can be carefully controlled by use of a suitable attenuator to change the intensity of the reference spectral portion of the reflected light and thus subsequent light chambers along the path of objects to be sorted will enable the separation of the various objects into several different groups in accordance with color degrees.

By the use of a light chopper in combination with a single photo-electric cell, the two filters and an attenuator, very accurate color selection can be achieved with extremely simple circuit components. Because of this improved and simplified optical and electrical design of the equipment, it can be made relatively portable, exhibit a high degree of reliability, and require substantially no maintenance over long periods of operation.

A better understanding of the preferred embodiments of the invention will be had by referring to the accompanying drawings in which:

FIGURE 1 is a schematic view of a conveyor means and two of the automatic sorting systems of this invention;

FIGURE 2 is another schematic view showing in side view the light chamber and other major components of one of the systems of FIGURE 1;

FIGURE 3 is a top plan view of the light chamber taken in the direction of the arrows 3—3 of FIGURE 2;

FIGURE 4 is an enlarged schematic view of that portion of the structure enclosed within the circular arrow 4 of FIGURE 2;

Figure 5:
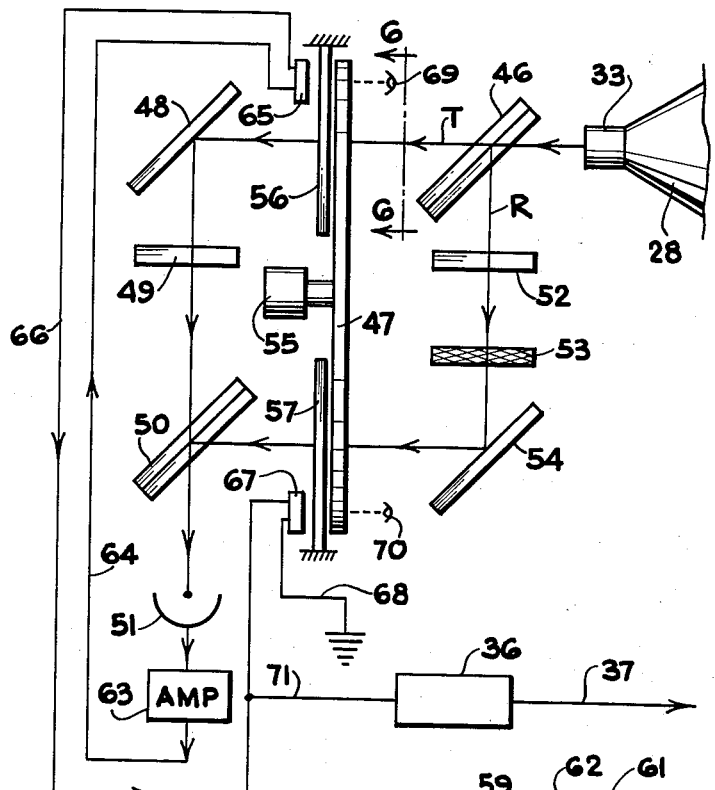
FIGURE 5 is an enlarged schematic diagram of the light analyzing and signal generating portions of the system illustrated in FIGURE 2.

Referring first to FIGURE 1, there is illustrated a portion 10 of a circular conveyor means such as a turn table. The turn table is provided with a series of spaced receptacles in the form of cups 11, 12, 13, 14, 15, 16, 17, and so on. Stationarily positioned with respect to the turn table 10 are shown two of the sorting units of this invention indicated by the blocks 18 and 19. The arrangement is such that objects in the cups will be individually passed through the units as the turn table rotates.

Associated with each of the sorting units 18 and 19, respectively, is a chute such as at 20 and 21. The various receptacles or cups are each provided with a movable sidewall or door as indicated at 22 and 23 for the cups 13 and 17. These side doors are arranged to be actuated in response to a signal from the sorting units 18 or 19. Thus, assuming that plurality of objects such as lemons are to be sorted according to their color, the various spaced units 18 and 19 will separate certain ones of the lemons by triggering the side door of the corresponding cup passing therethrough to release the lemon into its associated chute.

In FIGURE 1, for example, the lemon 24 is shown entering the chute 20 from the cup 13. This lemon possessed a sufficient greenness as determined by the degree of its color to warrant separation from the remaining lemons on the turn table. The sorting unit 18 which is adjusted to be sensitive to this particular degree of color, thus triggered the side door 22 of the cup 13 to release the lemon 24. The turn table 10 is rotating with sufficient speed to throw the lemon out by centrifugal force into the chute and there is sufficient delay between the response of the unit 18 and the mechanical actuation of opening the side door so that the cup 13 formerly within the unit 18 will be in approximately the position illustrated in FIGURE 1 to release the lemon in question. The next lemon 25 indicated at dotted lines within the cup 12, will be undergoing analysis as the lemon 24 is released.

When the lemons remaining on the turn table reach the next unit 19, another selection will be made. For example, as indicated in dotted lines at 26, a lemon is undergoing analysis in the unit 19 and this unit is adjusted to select a different degree of color from that of the unit 18. If the lemon 26 within the unit 19 is characterized by such color, it will then be released. For example, the lemon 27 in the cup 17 previously within the unit 19 was characterized by a color to which the unit 19 was responsive and thus is shown being released into the chute 21.

While only two units 18 and 19 have been shown in FIGURE 1, it will be evident that several sorting units may be provided to group the various lemons from the turn table in accordance with degrees of their color. Each of the units is substantially identical in structure except for adjustment of certain optical components therein, as will become clearer as the description proceeds.

Referring now to FIGURE 2, there is shown a schematic diagram partly in block form of the unit 19 of FIGURE 1, for the selection of the lemons or other objects on the basis of color. As shown in FIGURE 2, the unit includes a generally C-shaped light conducting material 28, the C portion 29 thereof defining a light chamber for receiving the cups and lemons consecutively as they are moved by the turn table 10. For example, within the light chamber 29 of FIGURE 2 there is shown the lemon 26 within the cup 16.

On each side of the light conducting material 28 are provided light sources such as indicated at 30, 31, and 32 arranged to direct light onto the object such as the lemon 26 so that light reflected therefrom will be collected within the walls of the material 28 and conducted to the left hand tapered end thereof to a suitable collimating lens 33. The cups may be of transparent plastic or wire screening so that maximum reflection area is provided. The light conducting material 28 may comprise a transparent plastic of high index of refraction such as the plastic identified by the trademark "Lucite." The reflected light from the light chamber is then passed into an analyzing means indicated by the block 34. Block 34 is connected to a signal generating means 35 which is designated to provide a suitable control signal in the event the lemon or other object being analyzed exhibits a certain color characteristic. The signal from the signal generating means 35 may be passed through an integrating circuit 36 connected by line 37 to suitable mechanism for opening the side wall or door of the cup.

In the plan view of FIGURE 3, it will be evident that additional light sources 38 and 39 may be provided on the opposite side of the light conducting material 28 so that substantially the entire surface of the object or lemon is bathed in light. To minimize interference from the direct light from the sources 30, 31, and 38 and 39, an opaque light shielding material 40 and 41 may line the outer surfaces of the light conducting material 28.

FIGURE 4 shows in detail one means for actuating the side door release of the cups, such as the cup 16, in response to a signal in the line 37. As shown, there may be provided a solenoid 42 arranged to project its plunger 43 upon receipt of a signal in the line 37. The plunger 43, if projected, is positioned to trigger a swivel 44 to move the side wall portion 45 of the cup 16 to the dotted line position. The centrifugal force of the lemon will then cause it to roll out of the cup into the corresponding chute as described in connection with FIGURE 1. In the absence of the proper control signal in the line 37, the lemon will continue on the turn table to the next sorting unit. It will be clear to those skilled in the art that there are many different ways and means for effecting the actual sorting in response to a signal and such means per se form no part of the present invention.

Referring now to FIGURE 5, there is shown a detailed diagram of one embodiment of the analyzing portion indicated by the block 34 of FIGURE 2. As shown, light from the light conducting material 28 and collimating lens 33 is passed to a first beam splitter 46. Beam splitter 46 is arranged to transmit approximately one-half of the spectrum of the light, as indicated at T, and reflect the other spectrum half, as indicated at R. The transmitted spectral portion T then passes through one portion of a light chopper 47 to a first mirror 48 angled at 45 degrees to deflect the transmitted beam ninety degrees. The deflected beam passes through a light filter 49 to a second beam splitter 50. From the beam splitter 50, the transmitted spectral portion is passed to a photo-electric cell indicated at 51.

The reflected portion R of the light from the first beam splitter 46, is passed through a second filter 52, a light attenuator 53, to a second mirror 54 angled at 45 degrees to deflect the beam R through the lower part of the chopper 47. This reflected spectral portion then passes to the second beam splitter 50, and since the beam splitter 50 is designed similarly to the first beam splitter 46, this reflected portion will be again reflected to leave the second beam splitter 50 in the same direction as the transmitted portion and thus be received in the same photoelectric cell 51.

The light chopper 47 constitutes a rotating disc driven at relatively high speed by a motor 55. Associated with each of the portions of the rotating disc through which the transmitted and reflected light beams T and R pass are stationary mask 56 and 57.

Figure 6:
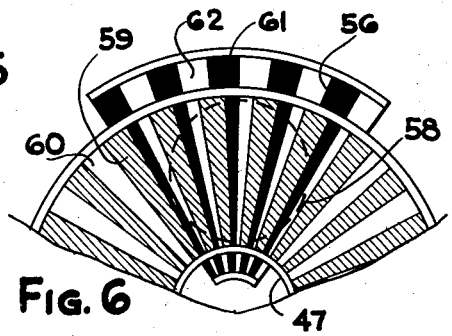
FIGURE 6 is an enlarged fragmentary front view of a portion of the light chopping means looking in the direction of the arrows 6—6 of FIGURE 5.

Referring particularly to FIGURE 6, the beam portion passing through the disc and mask is defined by the dotted circle 58. The rotating disc itself is formed of a series of opaque sectors 59 of equal arcuate extent and separated by a distance equal to such arcuate extent to leave a series of sector shaped openings 60. Similarly, the mask 56 is composed of similar opaque sectors 61 separated by openings 62. The arrangement is such that the collimated beam width as indicated at 58 will be chopped when the opaque sectors 59 of the rotating disc 47 eclipse the corresponding openings 62 in the stationary mask 56 and will be transmitted when the openings 60 register with the openings 62. Thus, chopping will occur several times during a single rotation of the disc. By increasing the number of sectors, a very high frequency of chopping can be achieved.

The lower mask 57 is similar to the mask 56 but includes opaque sections in diametrically opposite positions to the open sections between the opaque sections 61 of the mask 56. Similarly, the portions of the disc diametrically opposite the sectors 59 are open. The arrangement is such that when the light beam T passing through the upper portion of the disc 47 between the beam splitter 46 and mirror 48 is eclipsed by the chopper, the light beam R between the mirror 54 and beam splitter 50, is transmitted. Similarly, when the light beam R between the mirror 54 and beam splitter 50 is eclipsed by the chopper, the light beam T between the beam splitter 46 and the mirror 48 is passed. The transmitted and reflected spectral portions are thus alternately passed through the filters 49 and 52 to the second beam splitter 50.

The signal generating portion of the circuit designated by the block 35 in FIGURE 2 is shown in FIGURE 5 as including an amplifier 63 connected to the photo-electric cell 51. The output of the amplifier 63 passes through a lead 64 to a photo-sensitive resistance cell 65 connected in series through lead 66 to a second photo-sensitive resistance cell 67 in turn grounded through lead 68. The photo sensitive resistance cells 65 and 67 are shown disposed behind the masks 56 and 57 of the chopper and are arranged to be alternately exposed by light from individual sources such as at 69 and 70. A lead 71 connects to the lead 66 between the resistance cells 65 and 67 to the integrating circuit 36 which may include a storage condenser to integrate voltage signals on the line 71 and a discharge circuit for providing current in the line 37 to operate the relay or solenoid coil 42 of FIGURE 4. This electrical portion of the circuit will be described in greater detail when the overall operation is set forth.

Figure 7:
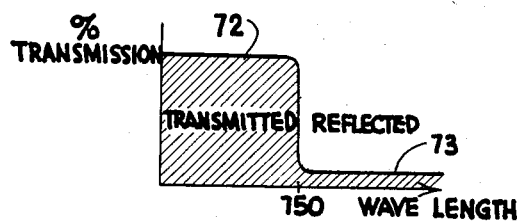
FIGURE 7 is a light transmission graph illustrating the optical characteristics of the beam splitters employed in the diagram of FIGURE 5.

Referring now to FIGURE 7, there is shown a graph 72 indicating the transmission characteristics of the first beam splitter 46. This beam splitter preferably constitutes multilayer filters for transmitting the shorter wave lengths of light from the collimating lens 33 down to, for example, 750 milli-microns and reflecting any light of longer wave length, as indicated by the curve portion 73. Thus, the visible portion of the light spectrum is transmitted through the beam splitter 46 while the longer wave lengths preferably just beyond the visible portion of the spectrum are reflected.

Figure 8:
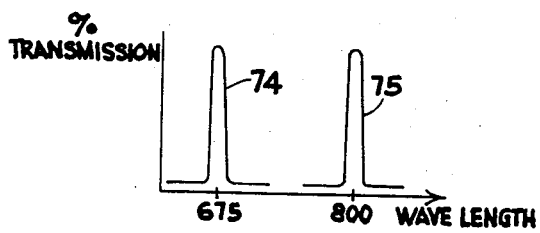
FIGURE 8 is a spectral graph illustrating the characteristics of the filters in the diagram of FIGURE 5.

The filtering action of the filters 49 and 52 in turn are illustrated in FIGURE 8 wherein it will be noted that the curve 74 illustrates a narrow band pass in the neighborhood of 675 milli-microns wave length for the filter 49 and the curve 75 a narrow band pass in the neighborhood of 800 milli-microns for the filter 52.

It has been found in the case of lemons of all colors, for example, that there is relatively good reflection for the longer wave length or infra-red region and that in the neighborhood of 675 milli-microns there is an extremely wide variation in reflectivity of different lemons as a consequence of absorption of red color shades by the presence of chlorophyll. Thus, the amount or intensity of reflection within the band pass 74 as indicated in FIGURE 8 will serve as an excellent indication of the quality of the lemon being analyzed. Since each individual lemon is analyzed as it is moving through the light chamber, the overall light reflection therefrom varies considerably during the traversal. It is essential, therefore, that a reference reflection from the same lemon be used for comparison to the indicating reflection of such lemons. The spectral band defined by the curve 75 of FIGURE 8 is used for this reference. It has been found that all lemons will reflect substantially uniformly in the spectral portion just above visible light and for this reason the narrow band width in the neighborhood of 800 milli-microns is selected. It will be evident, accordingly, that a comparison of the light intensities from filters 49 and 52 as by the taking of their ratio, for example, will serve as an excellent indication of the degree of greenness or color of the lemon being analyzed.

Figure 9:
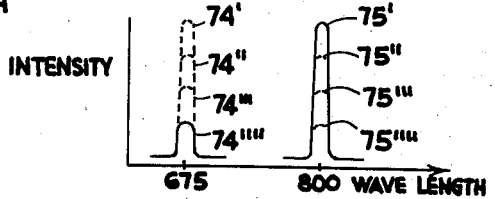
FIGURE 9 is another graph showing variations in the filter characteristics useful in explaining the operation of the system shown in FIGURE 5.

For example, referring to FIGURE 9, if the lemon being investigated is quite green thereby requiring some time to mature to ripeness, a relatively small light intensity as indicated by the curve 74'''' will be passed. On the other hand, if a more mature lemon passes within the light chamber, the degree of reflectivity in the red increases, correspondingly increasing the magnitude of the intensity of the light passed through the band pass in the vicinity of 675 milli-microns. Thus, the dotted line curve 74''' indicates a degree of greenness slightly less than that indicated by the solid curve 74'''' while the increasing amplitude curves indicated by the dotted lines 74'' and 74' indicate less red absorption and consequently a more yellow color. Accordingly, the more light transmitted through the filter 49 within the pass band, the more ripe is the lemon under investigation.

Referring to FIGURE 9 to the curve 75', it will be noted that if a light attenuator such as attenuator 53 of FIGURE 5 is inserted, the magnitude of light intensity can be reduced to a value indicated by the curve 75''. If attenuation is increased by substituting a different light attenuator, the light may be decreased to a value indicated by the curve 75''' and similarly, it may be reduced to 75'''' or any other value between 0 and 75'. It will be evident from an inspection of FIGURE 9 accordingly that by the use of the light attenuator 53 in FIGURE 5 the reference indicating intensity curve 75' can always be made lesser than the color indicating intensity curve 74'. The electrical current generated in the photo-electric cell 51 of FIGURE 5 in turn will be a function of the intensity of light falling on the photo cell. Therefore, the output of the photo-electric cell 51 will be a signal which will alternately represent the intensity of the light passed by the filters 49 and 52 respectively and the magnitude of this electric current will vary with variations in these light intensities.

As a specific example of the operation of the system shown in FIGURE 5, assume that it is desired to separate the yellow lemons from green lemons. In this event, it would be desired to actuate the side wall or door of those cups in FIGURE 1 containing yellow lemons and to this end the circuit would be designed to generate the proper signal via lead 37 to actuate solenoid 42 only when such yellow lemons are present within the light chamber. Thus, an attenuator 53 would be inserted to attenuate the reference spectral light portion sufficiently so that its peak intensity passed through the filter 52 would be of less magnitude than the peak intensity of the indicating spectral portion only for the yellow lemons. Referring to FIGURE 9, it will be recalled that for green lemons, minimum transmission of light will take place through the filter 49 in the neighborhood of 675 milli-microns. Assuming it is desired to sort out yellow lemons having only a limited amount of red absorbance (near 675 milli-microns) such as is characterized by relative light intensities between that indicated by the curves 74'' and the maximum relative reflected intensity 74', the attenuator 53 should be such as to cut off the maximum intensity of the reference light at, for example, the point 75''. For more green (less yellow) lemons, the indicating spectral portion intensity will be below the reference curve 75'' such as indicated at 74''' or 74''''.

In order to generate an actuating signal only when the indicating spectral portion is of greater intensity than the reference spectral portion, some means must be provided for distinguishing between the alternating signals appearing in the photo-electric cell 51 of FIGURE 5.

Figure 10:
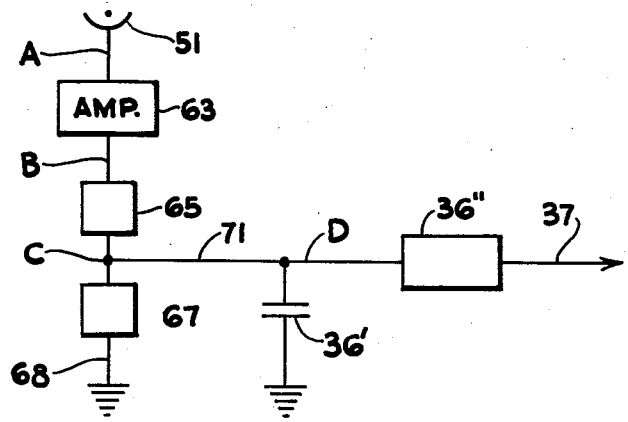
FIGURE 10 is an enlarged schematic diagram of the electrical circuit employed in FIGURE 5.
Figure 11:
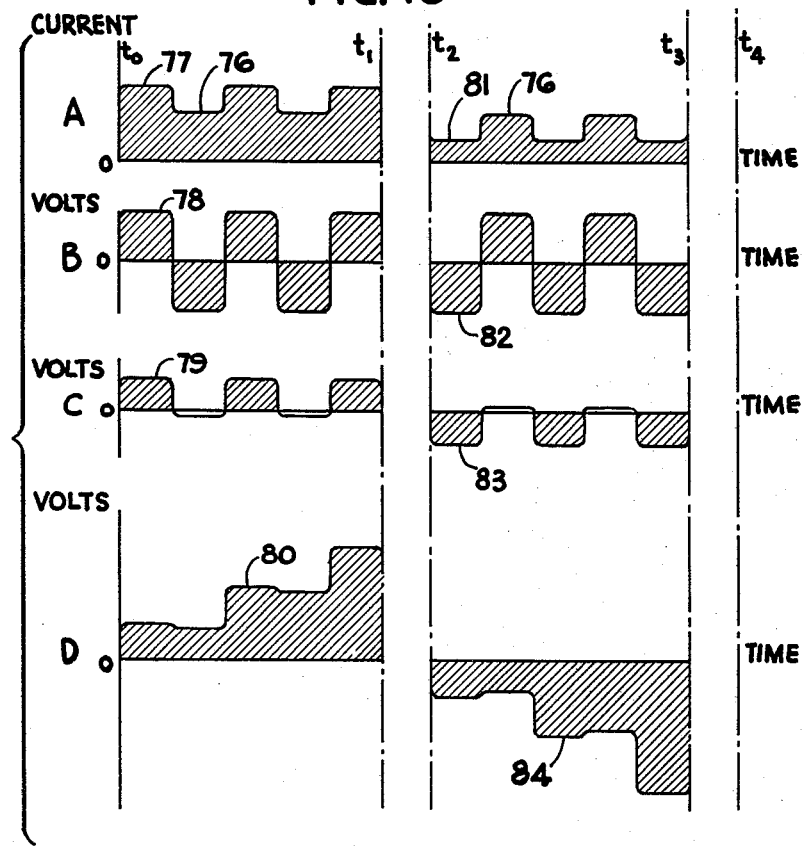
FIGURE 11 illustrates a series of timing wave forms useful in explaining the operation of the circuit of FIGURE 10.

Referring to FIGURE 10, the electrical portion of the circuit of FIGURE 5 is reproduced. In this figure, the integrating circuit 36 of FIGURE 5 is illustrated as a simple storage condenser 36' and discharge device 36". The output from this storage condenser passes to the current discharge device 36" which may constitute a Thyratron biased to fire under a given voltage value as stored up on the condenser 36'. The current discharge 36" in turn transmits a current through the line 37 of FIGURES 4 and 5 to actuate the relay 42 of FIGURE 4. FIGURE 11 illustrates various wave forms of corresponding letter places in the circuit of FIGURE 10.

Since the intensity of the indicating spectrum portion as indicated by the intensity curve 74' of FIGURE 9 is of different magnitude from the referenced spectral portion indicated by the curve 75", the currents alternately generated in the photo-electric cell will vary likewise in magnitude. Referring, for example, to the graph A of FIGURE 11, there is indicated schematically the alternating current magnitudes from the photo-cell 51. In this graph, the reference current is indicated at a level 76 while the higher magnitude current from the photo-cell as a consequence of the indicating spectral portion is indicated at 77. It will, of course, be understood that the frequency of alternation of the current between the level 76 and 77 is determined by the frequency of light chopping.

In the example chosen for illustrative purposes, it is assumed that the lemon under immediate examination is yellow to the extent that it should be separated from the remaining lemons. In this event, the signal from the photo-cell 51 indicated at 77 will be larger than the reference signal 76 as shown. The amplifier 63 of FIGURE 10 provides an A.-C. output signal representing an amplified wave form of the difference in magnitude between the signals 77 and 76. This wave form is shown at 78 in graph B. Graph C represents the voltage as it would appear at the point C in FIGURE 10 between the photo sensitive resistant cells 65 and 67 in the absence of the storage condenser 36'. It will be recalled by again referring to FIGURE 5 that these cells 65 and 67 are arranged to be alternately energized with light by the chopper disc 47 and light sources such as 69 and 70, which action will change their resistance value. The arrangement is such that the photo sensitive resistant cell 65 will be exposed to light from light source 69 in FIGURE 5 simultaneously with the transmission of light through the upper portion of the chopper disc 47 so that the cell 65 will have a very low resistance during this period. Simultaneously, the photo-sensitive resistance cell 67 will be blocked by the chopper disc from receiving light from the source 70 and its resistance, therefore, will be very high. Thus, during this half cycle of the signal, the corresponding half cycle of the difference signal 78 appears at the point C of FIGURE 10 with only a small loss of amplitude.

When the chopper disc has moved a few degrees so as to eclipse light from the resistance cell 65 and pass light to the resistance cell 67, the resistance of the cell 65 becomes very high and that of 67 relatively low. The half cycle of the difference signal 78 corresponding to the time the reference signal 76 is present in plot A of FIGURE 11 is transmitted to point C of FIGURE 10 as a substantially zero voltage since this point C is now at substantially ground potential because of the low resistance of cell 67. The voltage as indicated by the graph 79 of FIGURE 11 at the point C therefore appears as a series of positive half cycles.

When the condenser 36' is included in the circuit, these positive half cycles will build up a voltage on the condenser as indicated by the step function 80 of the graph D corresponding to the point D of FIGURE 10. The storage condenser 36' thus integrates the detected signal over a period of time corresponding to the traversal time $t_0$ to $t_1$ of the lemon through the light chamber. If the lemon is sufficiently yellow to provide a relatively high intensity signal 77 from the photo-cell and thus a relatively large positive half cycle signal 79, the voltage build up indicated by the curve 80 on the condenser will be sufficient over the traversal period to fire the current discharge device 36" in FIGURE 10 to provide current through the line 37 to operate the solenoid 32 of FIGURE 4 and thus separate this lemon from the remaining lemons on the table.

Assume now that the next lemon to be analyzed is sufficiently green that the indicated spectral intensity through the filter 49 of FIGURE 5 to the photo-electric cell is of relatively small magnitude, resulting in a smaller magnitude of current as compared to the reference current 76. Between the time divisions $t_2$ and $t_3$ in FIGURE 11 denoting the time during which the next lemon is being analyzed, there is thus shown the current magnitude 81 which is less than the reference magnitude 76. The difference signal now appears as indicated in graph B at 82 from the amplifier 63. Note, however, that this signal is reversed in phase as compared with the signal 78 for the first lemon so that when it is applied across the series connected cells 65 and 67, the signal in graph C is negative as indicated at 83 when the cell 65 is at a very high resistance and the cell 67 is of low resistance.

Accordingly, at the point C, the voltage will be in the form of negative half cycles and when integrated by the condenser 36' will cause a negative voltage to build up as indicated by the graph 84 at point D. At the end of the transit time, $T_3$, the negative voltage build up across the storage condenser 36' will be of the incorrect polarity to cause any discharge of current through the discharge device 36" so that there will be no current passed to the line 37. As a consequence, the solenoid of FIGURE 4 will not be actuated and the green lemon will remain on the turn table to pass to the next sorting unit.

It will be evident from the foregoing explanation that not only is the selection between green and yellow lemons relatively straight forward and simple, but by critical adjustment of the attenuator 53 of FIGURE 5, different degrees of greenness may be readily selected as explained in connection with FIGURE 9. It is thus evident that the present invention will enable very accurate sorting to be achieved.

Figure 12:
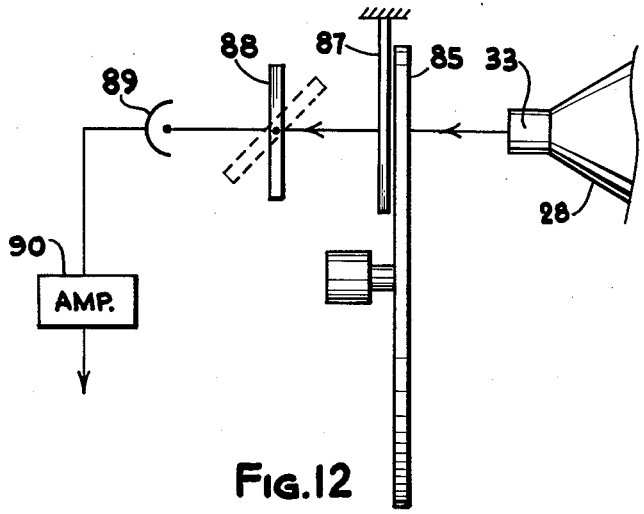
FIGURE 12 illustrates a second embodiment of the automatic sorting system of the invention.

Referring now to FIGURE 12, there is shown a second embodiment of the invention wherein the various beam splitters and mirrors discussed in the embodiment of FIGURE 5 are omitted. Referring to FIGURE 12, the reflected light from the light chamber and collimating lens 33 is passed through a light chopping disc 85 driven by a motor 86 and through a mask 87 disposed behind a portion of the chopping disc 85. The light then passes through an attenuator 88 to a single photo-electric cell 89 connected to an amplifier 90 similar to the photo-electric cell 51 and amplifier 63 of FIGURE 5. The remaining portion of the circuit from the photo-cell 89 and amplifier 90 may be identical to that described in connection with FIGURES 5, 10 and 11.

The desired analysis is effected by making up the mask 87 from different filters arranged alternately. Thus, referring to FIGURE 13, the mask 87 is formed by a series of alternately positioned sector shaped filters 91 between which are disposed similarly dimensioned sector shaped filters 92. The filters 91 may each be designed to pass a narrow spectral band in the neighborhood of 675 millimicrons as described with respect to the filter 49 of FIGURE 5 and depicted by the plot 74 in FIGURE 8. Similarly, the filter 92 may be designed to pass light only of wave length of the order of 800 milli-microns corresponding to the plot 75 of FIGURE 8. The rotating chopping disc 85 in turn is provided with opaque sectors 93 separated by open spaces 94. The arcuate extent of the opaque sectors 93 and open spaces 94 correspond to the arcuate extent of the filters 91 and 92.

By the above described arrangement, it will be evident that as the disc 85 is rotated rapidly light will be passed through the chopper and mask 87 as outlined by the dashed circle 95 first through one of the sets of filters such as all of the filters numbered 91 and then a moment later through all of the filters numbered 92 so that the light received in the photo-electric cell 89 will be alternately from two sets of filters, thereby providing the desired signals as described in connection with FIGURE 9.

Figure 13:
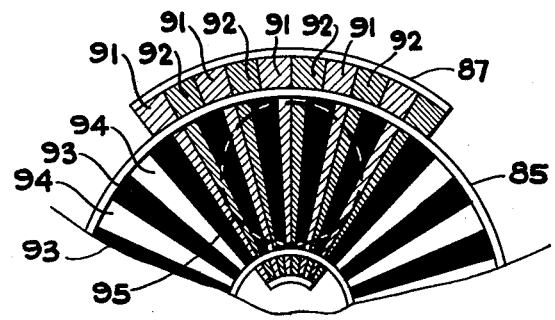
FIGURE 13 is an enlarged fragmentary front view of the light chopper employed in the system of FIGURE 12; and, FIGURE 14 is a fragmentary front view of a modified type of light chopper.

In the embodiment of FIGURES 12 and 13, the attenuator 88 is designed to attenuate only light in the neighborhood of 800 milli-microns in wave length and to transmit with substantially no attenuation light of the order of 675 milli-microns. Therefore, only the light from the set of filters 92 is attenuated corresponding to the action of the attenuator 53 of FIGURE 5. By making the attenuator 88 of the interference filter type, tilting the attenuator to vary the angle of light incidence as indicated in dotted lines will vary the degree of attenuation and thereby vary the intensity of the reference spectral portion 75′, 75″, 75‴, and 75⁗ of FIGURE 9.

The sector shaped filters can be made removable so that different types of filters can be used to vary the apparatus for different particular uses. The use of a plurality of sectors in co-operation with the mask enables many alternations to be effected for each rotation of the disc so that a large number of signal alternations will be received during a single analysis of a lemon and the entire procedure may be effected relatively rapidly. Except for the modified type of stationary mask and the different attenuator, the system of FIGURES 12 and 13 is identical in operation to that of FIGURE 5.

Figure 14:
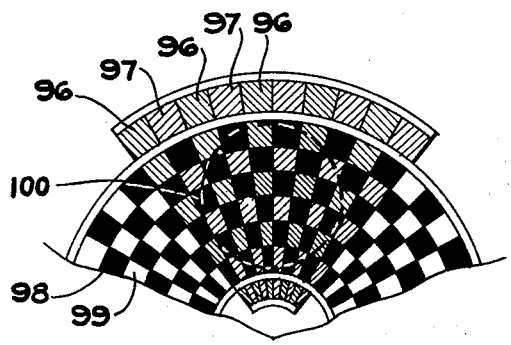

Referring now to FIGURE 14 there is shown yet another modified type of chopper usable with the system illustrated in FIGURE 12. In FIGURE 14, rather than sectors, a checker board pattern of the filters is made up on the mask to co-operate with a checker board disc. Thus, there is provided a mask made up of a checker board pattern of filters 96 and 97 all of the filters 96 being of one type and all of the filters 97 being of another type. The chopping disc, on the other hand, is made up of a checker board of opaque and open spaces as indicated at 98 and 99, respectively. The arrangement is such that when the disc is rotated past the mask, light within the dashed circle 100 defining the beam is passed first through one set of filters all of the same type and then through the other set. The reason for a checker board pattern is to compensate for possible non-uniformity in the cross section of the beam itself and thus render more uniform the intensity of light transmitted through either filter set with respect to the subsequent transmission through the same set.

From the foregoing description, it will be evident that the present invention has provided a greatly improved automatic sorting system. Not only is the device extremely simple in that only a single photo-electric cell is necessary together with greatly simplified electrical portions thereof, but as a consequence of the use of high quality filters, discrimination between various colors can be extremely accurately achieved.

Modifications that fall clearly within the scope and spirit of this invention will occur to those skilled in the art. The automatic sorting mechanism is, therefore, not to be though of as limited to the specific examples set forth for illustrative purposes in connection with lemons.

What is claimed is:

1. In an apparatus for sorting objects by analyzing the reflected light from said objects and including generating means to provide a signal only in response to the presence of a given characteristic of the reflected light from various ones of said objects to actuate suitable means for separating said various ones of said objects, an improved analyzing means including, in combination: a first beam splitter transmitting one portion of the spectrum of said reflected light and reflecting another portion of said spectrum; a second beam splitter; first and second mirrors positioned respectively to pass the transmitted portion of said spectrum and the reflected portion of said spectrum to said second beam splitter, said transmitted portion being passed and said reflected portion being reflected by said second beam splitter so that said transmitted and reflected portions pass from said second beam splitter in the same direction; a light chopping means positioned to intersect said transmitted and reflected portions prior to reaching said second beam splitter for alternately shutting off said transmitted and reflected portions so that only one of said portions passes from said second beam splitter at a time; and a photo-electric cell positioned to receive said spectrum portions from said second beam splitter, said signal generating means being responsive to the relative magnitudes of the currents generated by said photo-electric cell in response to reception of said transmitted and reflected portions of said spectrum respectively in said photo-electric cell.

2. The subject matter of claim 1, in which said analyzing means further includes first and second filters positioned to intercept said transmitted and reflected portions of said spectrum respectively before reaching said second beam splitter, said first filter passing only a narrow band within said spectrum of said transmitted portion, and said second filter passing only a narrow band within said spectrum of said reflected portion.

3. The subject matter of claim 2, in which said analyzing means additionally includes a light attenuator positioned to intercept said reflected spectral portion prior to passing to said second beam splitter.

4. In an apparatus for sorting objects by analyzing the reflected light from said objects and including generating means to provide a signal only in response to the presence of a given characteristic of the reflected light from various ones of said objects to actuate suitable means for separating said various ones of said objects, and improved analyzing means including, in combination: a light chopping means comprising two different filters alternately positioned to intercept said reflected light so that only light falling within a first narrow spectral band is passed by one of said filters and light falling within a second narrow spectral band is passed by the other of said filters; a photo-electric cell positioned to receive said filtered light alternately from said two filters in said light chopping means, said signal generating means being responsive to the relative magnitudes of the currents generated by said photo electric cell in response to reception of said light from said two filters respectively; and a light attenuator positioned to intercept and attenuate light from only one of said two different filters so that the magnitude of one of said currents generated by said photo-electric cell in response to light from said one of said two different filters is less than is the case in the absence of said light attenuator, whereby the initial relative magnitudes of said currents may be adjusted.

5. In an apparatus for sorting objects by analyzing the reflected light from said objects and including generating means to provide a signal only in response to the presence of a given characteristic of the reflected light from various ones of said objects to actuate suitable means for separating said various ones of said objects, an improved analyzing means including, in combination: two different light filters; a rotating disc positioned to intercept said reflected light and pass said light through one of said filters and then through the other of said filters in alternate manner; and a photo-electric cell positioned to receive alternately filtered light from said filters, said signal generating means including a pair of resistance cells connected in series between said photo cell and ground, each of said resistance cells being photosensitive to light such that its resistance varies as a function of the intensity of light shining thereon, said resistance cells being alternately exposed to light at a frequency equal to the rate of light chopping by said rotating disc, whereby their resistance values alternately vary between relatively high and relatively low values; an integrating means connected between the junction point of said resistance cells and ground; and a discharge circuit connected across said integrating means for passing current upon discharging, to provide said signal to said means for separating said various ones of said objects.

6. The subject matter of claim 5, including an amplifier having its input connected to said photo cell, and its output connected to said series connected resistance cells to pass currents to said resistance cells having magnitudes that are functions of the light intensity alternately received in said photo cell from said filters.

7. In a color analyzing means, an optical system for alternately passing separated spectral portions of light, comprising, in combination: a plurality of each of two different light filters; and means for passing said light alternately through said filters so that only light falling within a first narrow spectral band is passed by one of said filters and light falling within a second narrow spectral band is passed by the other of said filters, said means including a rotating disc; a stationary mask, said filters being sector shaped and alternately positioned in said stationary mask in juxtaposition to said rotating disc, said disc being provided with a series of opaque sectors each of equal arcuate extent and separated from each other by a distance equal to said arcuate extent, said arcuate extent being equal to the arcuate extent of each of said filters whereby light passes alternately through said different light filters several times during a single rotation of said disc.

8. In a color analyzing means, an optical system for alternately passing separated spectral portions of light, comprising, in combination: a plurality of each of two different light filters; and means for passing said light alternately through said filters so that only light falling within a first narrow spectral band is passed by one of said filters and light falling within a second narrow spectral band is passed by the other of said filters, said means including a rotating disc; a stationary mask; said plurality of each of said two filters being provided in the form of a checker board array on said stationary mask, said rotating disc being positioned behind said mask and provided with a similar checker board array of opaque and open areas whereby light passes alternately through said different light filters several times during a single rotation of said disc.

9. The subject matter of claim 8, including, in combination: an attenuator comprising an interference type filter for attenuating only light falling within said second spectral band; said attenuator being positioned in the path of said light to form a desired angle of incidence therewith to in turn effect a desired degree of attenuation.

10. In a system including a photo-electric cell receiving two light signals alternately at a given frequency to provide corresponding electric signals, means for generating a signal in response to one of said electric signals only when it exceeds the other of said electric signals in magnitude, comprising: a pair of resistance cells connected in series to receive said electric signals and pass them to ground, each of said resistant cells being photo sensitive to light such that its resistance varies as a function of the intensity of light shining thereon, said resistance cells being alternately exposed to light at a frequency equal to said given frequency, whereby their resistance values alternately vary between relatively high and relatively low values; an integrating means connected between the junction point of said resistance cells and ground; and a discharge circuit connected across said integrating means for passing current upon discharging, to provide said signal.

11. In an apparatus for sorting objects by analyzing light from said objects and including signal generating means to provide a signal only in response to the presence of a given characteristic of the light from various ones of said objects to actuate suitable means for separating said various ones of said objects, an improved analyzing means including, in combination: a plurality of each of two different light filters; a rotating disc positioned to intercept said light and pass said light through one of said filters and then through the other of said filters in an alternate manner; a stationary mask, said filters being sector shaped and alternately positioned in said stationary mask in juxtaposition to said rotating disc, said disc being provided with a series of opaque sectors each of equal arcuate extent and separated from each other by a distance equal to said arcuate extent, said arcuate extent being equal to the arcuate extent of each of said filters so that the light passes alternately through said different light filters several times during a single rotation of said disc; and a photoelectric cell positioned to receive light from said filters, said signal generating means being responsive to the relative magnitudes of the currents generated by said photoelectric cell in response to reception of light alternately received in said cell from said filters, respectively, said signal for separating said various ones of said objects being generated only if the current in said photocell as a consequence of light from one of said filters is greater in magnitude than the current as a consequence of light from the other of said filters.

12. In an apparatus for sorting objects by analyzing light from said objects and including signal generating means to provide a signal only in response to the presence of a given characteristic of the light from various ones of said objects to actuate suitable means for separating said various ones of said objects, an improved analyzing means including, in combination: a plurality of each of two different light filters; a rotating disc positioned to intercept said light and pass said light through one of said filters and then through the other of said filters in an alternate manner; a stationary mask; said plurality of each of said two different filters being provided in the form of a checker board array on said stationary mask, said rotating disc being positioned behind said mask and provided with a similar checker board array of opaque and open areas so that light passes alternately through said different light filters several times during a single rotation of said disc; and a photoelectric cell positioned to receive light from said filters, said signal generating means being responsive to the relative magnitudes of the currents generated by said photoelectric cell in response to reception of light alternately received in said cell from said filters, respectively, said signal for separating said various ones of said objects being generated only if the current in said photocell as a consequence of light from one of said filters is greater in magnitude than the current as a consequence of light from the other of said filters.

References Cited in the file of this patent

UNITED STATES PATENTS

| | | |
|---|---|---|
| 1,863,363 | Zworykin | June 14, 1932 |
| 1,866,573 | Lux | July 12, 1932 |
| 1,945,395 | Cockrell | Jan. 30, 1934 |
| 2,152,645 | Holven et al. | Apr. 4, 1939 |
| 2,162,529 | Dawson et al. | June 13, 1939 |
| 2,446,628 | Brown | Aug. 10, 1948 |
| 2,531,529 | Price | Nov. 28, 1950 |
| 2,576,758 | Jones | Nov. 27, 1951 |
| 2,674,154 | Crandell | Apr. 6, 1954 |
| 2,764,060 | Horak | Sept. 25, 1956 |
| 2,856,811 | Kaye | Oct. 21, 1958 |
| 2,877,356 | Iddings | Mar. 10, 1959 |
| 2,892,124 | Rabinow | June 23, 1959 |
| 2,933,613 | Powers | Apr. 19, 1960 |